E. SCHWETER.
VALVE GEAR.
APPLICATION FILED FEB. 20, 1913.
1,061,130.
Patented May 6, 1913.
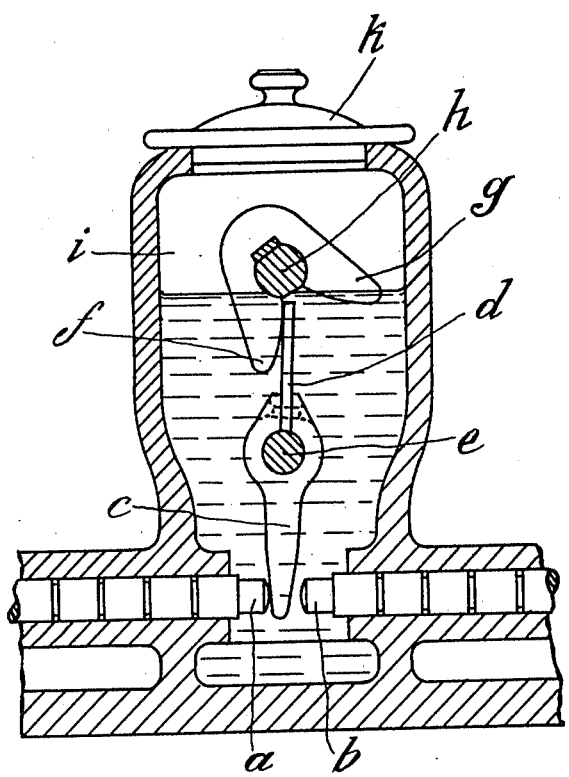
WITNESSES:
John C. Sanders
Albert F. Houman
INVENTOR:
Erich Schweter
BY Wm Wallace White
ATTY

UNITED STATES PATENT OFFICE.

ERICH SCHWETER, OF GOLUTWIN, RUSSIA.

VALVE-GEAR.

1,061,130. Specification of Letters Patent. Patented May 6, 1913.

Application filed February 20, 1913. Serial No. 749,628.

*To all whom it may concern:*

Be it known that I, ERICH SCHWETER, a subject of the King of Prussia, residing at Golutwin, Russia, have invented new and useful Improvements in Valve-Gears, of which the following is a specification.

This invention relates to valve gears comprising valve spindles coaxial with each other and parallel to the axis of the cylinder, and a rocking lever arranged between the said valve spindles adapted to be actuated by a second rocking lever, and it consists essentially in shaping the rocking levers as rolling levers. By this means a rolling lever valve gear is produced which unites the simplicity of the well-known rocking lever valve gear with the same arrangement of valves, but without the drawback inherent to the latter gear that even slight changes in the positions of the fulcrums of the levers have a considerable influence on the operation of the valves. According to the present invention the two-armed rolling lever which engages with one arm between the mutually facing ends of the valve spindles of the two admission and exhaust valves, engages with its other arm between the rolling-surfaces of the two arms of the other rolling lever which receives oscillating motion from an external actuating device.

In the example shown in drawing, the arm of the rolling lever which operates the valve spindles and which engages between the two arms of the externally actuated rolling lever, is made resilient for the purpose of accelerating the opening and closing movement of the valve.

A practical construction of gear according to this invention is illustrated in the accompanying drawing, showing a vertical section.

The spindles $a$ and $b$ of the admission and exhaust valves are formed with spherically rounded ends, and are arranged coaxial with and facing each other. The rolling lever $c\ d$ has a fixed fulcrum $e$, and its arm $c$ engages between and rolls over the two ends of the spindles $a$ and $b$. The upper arm $d$ of the rolling lever $c\ d$ engages between the arms $f$ and $g$ of the other rolling lever $f\ g$ which is adapted to be rocked on a fixed axis or fulcrum $h$ by means of an external actuating device. The rolling surfaces of this lever $f\ g$, are arranged, facing each other on the inner sides of the arms $f$ and $g$. The whole of the gear is inclosed in an oil chamber $i$ which is closed dust-tight by means of a lid $k$. Both rolling levers are shaped symmetrically to the central lines of their respective axes of oscillation. The upper arm $d$ of the rolling lever whose arm $c$ engages between the ends of the valve spindles $a$ and $b$, is contacted in a rolling manner by the rolling surfaces of the arms $f$ and $g$ of the externally actuated rolling lever; it is made resilient for instance in the form of a leaf spring.

In the case that the valve intended to be operated is the steam valve of a steam engine, the spindles $a$ and $b$ of the said valve will be acted upon by the force of the valve spring and the pressure of the steam. Then if at the commencement of the opening movement of the valve the rolling lever $f\ g$ is in contact with the spring arm $d$ of the rolling lever $c\ d$, the resistance of the spring arm $d$ will be *nil* owing to the elasticity of the latter. Consequently no shock will be produced by the contact of the two rolling levers. Then as the rolling movement proceeds, the spring arm $d$ of the rolling lever $c\ d$ will become increasingly stressed until its stress overcomes the resistance offered by the valve spring and the steam pressure. At the moment the valve will begin to open, and this opening movement will take place with very considerable rapidity because the steam pressure which has until then been acting upon the valve, ceases at the moment of opening. The valve is thus caused to fly open. The rapidity of this opening movement of the valve is very much greater than that produced by ordinary rolling lever valve gears. The duration of the closing movement of the valve is also diminished because the spring arm $d$ of the rolling lever $c\ d$ is bent back at the end of the closing movement by the action of the valve spring which opposes the closing movement of the lever but aids the closing movement of the valve. By this means the valve is closed before the rolling lever $c\ d$ is released by the rolling lever $f,\ g$.

What I claim as my invention and desire to secure by Letters Patent, is:

A valve gear comprising in combination valve spindles coaxial with each other and parallel to the axis of the cylinder, a rocking lever having two arms in substantially vertical alinement above and below its fulcrum, the lower arm being rigid and extending between the valve spindles, the upper arm being of a resilient nature, a second two-armed rocking lever of substantially inverted V-shape, adapted to have the curved inner surfaces of its depending arms engage said resilient arm of the first mentioned lever, and means for oscillating the inverted two-armed lever, substantially as described.

In testimony whereof I affix my signature in presence of two witnesses.

ERICH SCHWETER.

Witnesses:
LYDIA RÖLL,
CHR. ERFURT.

Copies of this patent may be obtained for five cents each, by addressing the "Commissioner of Patents, Washington, D. C."